UNITED STATES PATENT OFFICE

LESTER KIRSCHBRAUN, OF LEONIA, NEW JERSEY, ASSIGNOR, BY MESNE ASSIGNMENTS, TO THE FLINTKOTE CORPORATION, OF BOSTON, MASSACHUSETTS, A CORPORATION OF MASSACHUSETTS

BUILDING CONSTRUCTION

No Drawing.   Application filed February 25, 1927. Serial No. 171,072.

This invention relates to building construction, and has particular reference to insulating walls or the like which are employed in cold storage and refrigerator houses, and which may also constitute the walls of the smaller size refrigerators such as are used for domestic purposes.

One of the objects of the present invention is the production of insulating wall structures, which will be highly impervious to moisture and to the passage of moisture-laden air. A further object is the provision of a wall of this type which, while possessing waterproofing qualities, is additionally characterized by hardness and toughness sufficient to withstand abrasion, shock and chipping caused during usage by various agencies, as for example, stacking of objects against the wall surface.

A further object of the invention resides in the production of a coating for the purposes specified, which, while providing qualities characteristic of a cement structure will also exhibit the properties of a bituminous binding medium.

The waterproofing of structures of this type has been carried out in the past by applying thereto waterproofing material in the form of cut-backs, i. e., a solution of the material in an organic solvent. The use of such organic solvents to form such cutbacks is objectionable for numerous reasons, but chiefly because of the dangers attending the use of these solvents, which in nearly all cases are highly inflammable, and the cost. Moreover, the conditions prevailing in these structures when they are available for the application of coatings thereto, are not conductive to proper drying out or evaporation of the solvents usually employed. The temperatures are exceedingly low, and the atmosphere within the structure is usually such that it becomes very difficult for the solvent to evaporate and the coating to be completely dried.

For the purposes of the present invention and similar purposes, there is advantageously employed as the protective coating for the cork or other insulating material, a mastic comprising sand, cement, and bituminous emulsion, all in suitable proportions. The emulsion which may be employed for this purpose preferably comprises a dispersion of a bitumen-pitch type base, or similar waterproofing material, in an aqueous suspension of colloidal emulsifying agent such as clay, mineral powder, or other inert emulsifying agent, such as described in my issued Patent No. 1,615,303 dated January 25th, 1927. By "inert" I means one which will impart to the emulsion such stability that the cement or any of its constituents will not function to break down the emulsion, even though the latter may be flocculated to some extent. The content of emulsifying agent in the emulsion is preferably relatively small, and comprises about 3 to 10% more or less, of the emulsion.

By the use of an emulsion of this type it is possible to apply the coating to the insulating wall while the coating is in a cold condition without the use of cut-backs. Furthermore, by using an emulsion of the character set forth, it becomes possible to use substantial quantities of cement to facilitate setting and drying of the coating, this action being unaffected by the low temperatures and bad drying conditions usually prevailing in cold storage and refrigerator houses.

Moreover, the stability of the emulsion enables substantial quantities of cement to be mixed therewith, the water comprising the external phase of the emulsion functioning also to cause the setting-up of the cement.

Accordingly, when the emulsion is mixed with the cement in suitable proportions, and the mastic has been applied as hereinafter to be described and then allowed to dry, the resultant coating is very hard, tough, and resistant to abrasion as well as highly impervious to air and moisture.

Before applying the coating to the surface of the insulating wall, there may be first preferably applied to the surface, either by means of an air spray or with a fibre brush, a primer coating comprising preferably a stable bituminous emulsion of the character above described. This primer coating may be permitted to dry completely before applying the coating of mastic.

This mastic may be prepared in one mode of carrying out the present invention, by mixing 1 part more or less, by volume of Portland cement with 3 parts more or less by volume of sand, and 2 parts more or less, by volume of emulsion, the latter containing about 40% more or less of water.

Preferably, the sand and emulsion in the proportion stated are mixed together, and the cement is then incorporated, using water as desired. The order of mixing the ingredients may, however, be modified in certain cases. In one mode, for example, the sand and cement may be mixed dry, and thereafter a small amount of water incorporated in the mixture until the plastic mass is of the consistency of a light plaster. The bituminous emulsion may be then incorporated with the plastic mass and the whole is mixed either by hand or in a cement mixer until the cement and sand are substantially completely distributed through the emulsion. The consistency of the mass may be regulated by the addition of water.

In a number of instances, it may be desirable to incorporate fibrous material so as to impart to the coating additional strength and sufficient body to withstand cracking of the coating which sometimes occurs during settling. For this purpose I may form a fibrated emulsion by adding to the aqueous suspension of the emulsifying agent, a fibrous material such as wool flocks, asbestos fibre, rag fibre, or sulphate pulp, in amounts substantially equal to the amount of emulsifying agent, on the basis of weight. This aqueous suspension with its contained fibrous material is then employed in emulsifying the bituminous waterproofing material. Alternatively and with advantage, the fibrous material may be incorporated in the finished emulsion, instead of carrying on the emulsification in the presence of the fibres as above outlined. In either case, however, the fibrous material if of vegetable or animal origin, is employed in quantities such that it will comprise substantially four percent more or less by weight of the finished emulsion.

The sands which may be used in producing the mastic above described, is preferably such as will pass through a screen of about 14 mesh.

When the mastic as above described, has been prepared, and the primer coat of emulsion on the surface of the cork or other insulating wall has completely dried, all the cracks, crevices, depressions and joints appearing on the surface may be filled in with portions of the mastic so as to provide a substantially smooth surface. The mastic coating may be then troweled on in quantities sufficient to provide a coating of about one-eighth to one-fourth inches in thickness more or less. The mastic may be completely troweled over so as to provide as smooth a surface as is possible, and the coating is then allowed to dry. During this drying, there takes place an initial setting of the cement, followed by coalescence of the bituminous particles and completion of the setting of the cement to a hard and tough coating in which the bituminous particles are completely disseminated.

While the mastic has been above described as composed of 1 part by volume of cement to 2 parts by volume of emulsion and 3 parts by volume of sand, an invention may be carried out in which the proportion of cement is substantially increased to an extent in which the mastic may comprise 2 parts by volume of cement, 2 parts by volume of emulsion, and 3 parts by volume of sand, so that upon complete drying out and setting of the cement there will result a much harder coating than that produced by the mastic first above described.

In some cases it may be desirable to somewhat modify the proportions of the constituents, and in these cases there may advantageously be employed a mastic in which the cement comprises 1 part by volume, the emulsion 1 part by volume and the sand 2 parts by volume thereof.

In any case, however, the proportions are such that preferably, the bitumen constitutes between 12 and 20% of the dried coating. This range appears to be particularly advantageous for the reason that where the cement is used in quantities substantially less than those specified, it apparently acts only as a filler, without imparting to the coating any substantial toughness or ability to withstand abrasion and shock. On the other hand, where the cement is used in such increased quantities that the proportion of bitumen in the dried coating is materially less than the minimum above given, the resulting coating is too hard and brittle, exhibiting properties more nearly characteristic of concrete, and does not possess the essential qualities of a bituminous binding medium. This is particularly valuable in coatings such as here contemplated, where it is desirable in the event that the forces of friction, abrasion, and shock have been sufficient to cause a breaking down of the crystalline structure of the concrete, that the bituminous constituent of the coating will nevertheless be sufficient to act as a binding medium and prevent disintegration of the coating.

When the coating has become completely set and dried, there may be applied, if found desirable, an external or surfacing coat of paint which may take the form of an emulsion paint, or, in some instances, aluminum paint may be employed for this purpose.

Instead of applying the mastic in the manner above described, the invention may be carried out in which sand is mixed with emulsion and with fibre in the proportion of about four volumes of sand, two volumes of emulsion, and one volume of fibre. This mastic may then be applied to the surface intended to be coated, by troweling or similar means, and dry hydraulic cement then applied to the wet coating. The cement will take up the water in the emulsion as it is being applied, and thereby facilitate the drying of the coating while the water causes the setting of the cement.

While the present invention has been described in connection with coating insulating walls such as cork walls, it should be apparent to those skilled in the art, that the mastic as herein described, may be adapted for other analogous purposes, as for example, a coating for sound insulating ceilings or walls, or as a flooring.

This application of dry cement may be regulated to cover the surface, or the dry cement may be worked into the mixture so that a relatively homogeneous and stiff crust of emulsion, cement and aggregate, is produced.

A somewhat similar result in facilitating drying of the wet mixture is effected by the use of calcined lime or plaster of Paris which may be applied in a dry powdered state to the surface. These materials will absorb water from the emulsion and in particular, the lime is effective in that some heat is generated by the chemical combination of the calcined lime with the water.

I claim as my invention:

1. An insulating structure comprising a cork base and a substantially impervious coating on an outer face of the base comprising sand, and a binder of cement and a waterproofing material coalesced from an aqueous dispersion of said waterproofing material, said waterproofing material comprising 12% to 20% of said coating.

2. An insulating structure comprising cork, having applied to the surface thereof a primer coating of waterproof material, and a surface coating comprising sand, and a binder of cement and bitumen superposed over said primer coating, said bitumen comprising 12% to 20% of said latter coating.

3. An insulating structure comprising a cork base, and having an external coating, said coating including sand, and a binder of cement and bituminous waterproofing material, said bitumen comprising 12% to 20% of said latter coating.

4. An insulating structure comprising cork, having applied to a surface thereof a primer coating of waterproof material, a second coating comprising sand, and a binder of cement and bitumen superposed over said primer coating, and an external surfacing of paint applied to said second coating, said bitumen comprising 12% to 20% of said second coating.

5. An insulating structure comprising a cork base, having on one of its surfaces a coating comprising sand, and a binder of cement and bitumen, the latter in quantities sufficient to prevent disintegration of the coating upon destruction of the crystalline structure of the cement.

LESTER KIRSCHBRAUN.